Sept. 22, 1936.   R. E. PARIS   2,055,016
MACHINE CONTROL SYSTEM AND MEANS FOR CARRYING THE SAME INTO EFFECT
Filed Jan. 20, 1933   2 Sheets—Sheet 1

INVENTOR

Sept. 22, 1936.   R. E. PARIS   2,055,016
MACHINE CONTROL SYSTEM AND MEANS FOR CARRYING THE SAME INTO EFFECT
Filed Jan. 20, 1933   2 Sheets-Sheet 2
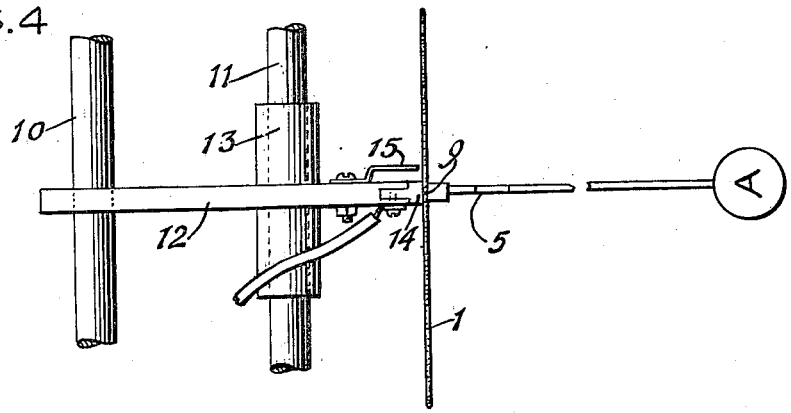
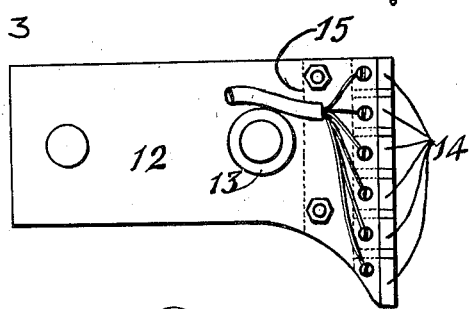
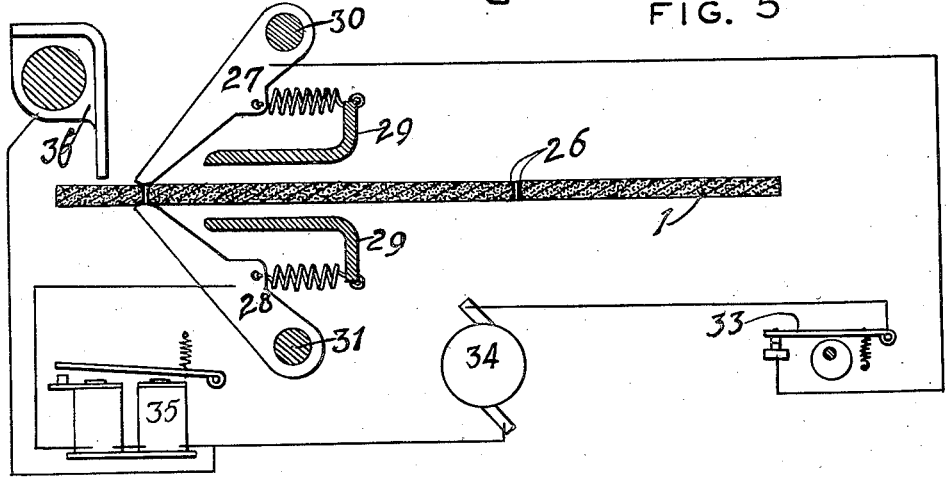

Patented Sept. 22, 1936

2,055,016

UNITED STATES PATENT OFFICE 2,055,016

MACHINE CONTROL SYSTEM AND MEANS FOR CARRYING THE SAME INTO EFFECT

Robert E. Paris, New York, N. Y.

Application January 20, 1933, Serial No. 652,640

1 Claim. (Cl. 197—6)

This invention relates to machine control systems and means for carrying the same into effect. Specifically it relates to means for making and utilizing a new type of punctured record.

The main objects of my invention are (a) to produce a new type of punctured record, (b) to provide a new means for simultaneously puncturing a record and producing a corresponding printed or visual record thereon, (c) to produce a new form of induction coil for use in producing and utilizing records, (d) to produce a new form of machine control for controlling statistical card sorters, tabulators, Jacquard looms, and like or analogous record controlled machines, and (e) to produce a new and useful system of making and utilizing punctured records.

This invention is in many respects a continuation of my inventions disclosed in my pending applications Ser. No. 492,523, filed Oct. 31, 1930 for Sorting machine, Ser. No. 475,370, filed Aug. 14, 1930 for Statistical cards or records, and Ser. No. 380,687, filed July 24, 1929, for Method and machines for making and utilizing records.

Figure 1:
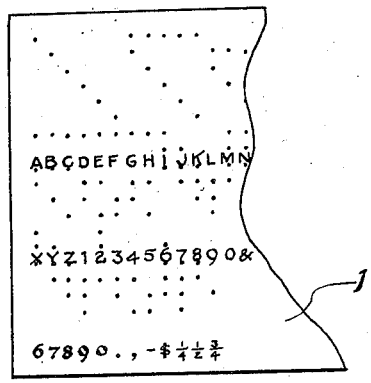
Figure 1:
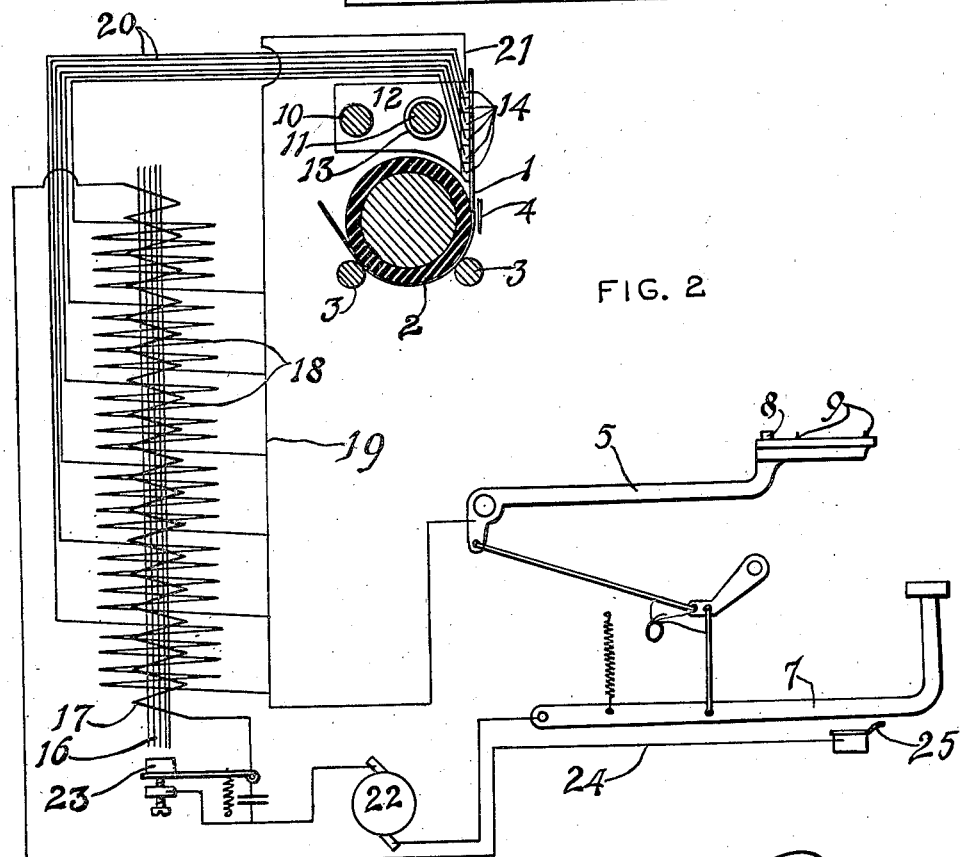
Figure 2:
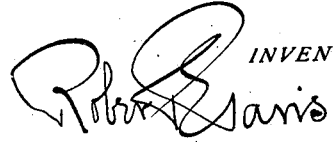

In the drawings, Fig. 1 is a fragmentary view of a record card punctured according to my invention; Fig. 2 is a somewhat diagrammatic view of a puncturing machine with attendant coil constructed according to my invention; Fig. 3 is an enlarged detail view of the contact supporter; Fig. 4 is a fragmentary top plan view of the card puncturing mechanism; Fig. 5 is a somewhat diagrammatic view of a machine control according to my invention.

I have shown my invention in connection with a record for statistical machines such as sorters, tabulators and perforators, whereby statistics may be recorded according to a "six-hole" combination system on record cards, the data being transcribed in a clearly readable form simultaneously with the puncturing, and which cards may then be utilized for controlling other statistical machines such as sorters and tabulators. However, my invention may be used for making Jacquard records, automatic music records, etc., and for controlling looms, pianos, etc. from such records. The invention is applicable in fact, for any sort of machine control possible of utilizing a record or master control.

In Fig. 1, I have shown a portion of a record card (numbered 1) made by the means shown in Fig. 2. This record making machine may take the form of the well-known Underwood typewriter having a platen 2, presser rolls 3, ribbon 4, type bars 5, connecting trains 6, and keys 7. On the type bars 5 are the usual type 8 (upper case only), and in addition, one or more needle points 9, the number of needle points being determined by the code puncturing required for the particular type character.

Above the platen 2, and supported by a stationary part of the machine (not mounted on the carriage), I provide two rods or rails 10 and 11 upon which is slidably mounted a contact holder 12 of insulating material. This holder is fast to a sleeve or broad bearing tube 13 slidable on rod 11. Any well-known lock or friction device for holding 12 where desired may be used, and I have therefore not shown any such lock. I could have shown 12 as fixed to 10 and 11, but it might be handy to slide 12 out of the way when doing straight typing. The front face of holder 12 has six contact plates 14 extending from side to side of holder 12. More or fewer plates 14 would be used according to the code selected. An auxiliary spark-gap plate 15 carried by 12 extends across all of the members 14 and is spaced from their ends a sufficient distance to carry off unnecessary sparks or current and yet permit the use of such sparks or current as may be needed in making the code punctures required.

I have designed a new type of induction coil for use with my system. This coil consists of the usual core 16 and primary winding 17, but is provided with a multiplicity (in this case six), secondaries 18 having a common lead 19 to all of the type bars 5, or to such as are used for puncturing. The other end of each secondary winding has a respective lead 20 to a respective plate 14. The auxiliary spark gap plate 15 is connected by a lead 21 to lead 19.

A battery or source of current is shown at 22 and has one side connected to all the key levers 7 and the other side connected to the primary, a standard well known make-and-break for induction coils being shown at 23. The other end of the primary is connected by a lead 24 to a spring contactor 25 common to all of the keys 7.

When a key is depressed, its type bar will be thrown to printing position, the key will contact 25 causing energizing of the primary and inducing spark causing current in the secondaries, member 23 causing a stream of sparks to be emitted as long as key 7 touches contact 25. As the type is driven to print, if contact holder 12 is in the vertical line of printing, the point or points 9 will be thrust into the record 1, and will either pierce or nearly pierce the record, so that the train of sparks from the respective plates 14 will pass to the needles, slightly charring the edges of the punctures as indicated in Fig. 5. This produces a puncture without a burr or extruded portion, which sometimes gives trouble in connection with mechanical perforating as now practiced. Only such plates 14 as are contacted or nearly contacted by a point 9 will pass their sparks to the type bar, the sparks from the other plates 14 being passed to the auxiliary spark gap plate 15, which, as I have already said, is adjusted for this purpose, the record 1 being of material capable for resisting sufficient electric pressure unless punctured or nearly punctured.

I would like to emphasize the fact that the orifices and inner walls of the punctures are slightly charred, for this charred portion is carbon and forms a readily sensed record not requiring very high pressures for passage of current for sensing and thereby effecting machine control.

In Fig. 5 I have indicated one form of sensing mechanism for my system. Here I have indicated the record as having perforations or punctures charred at 26. The record may be fed in any desired well known manner between spring pressed discharge members 27 and 28, which are carried by insulated bars 30 and 31 and which are never permitted to touch by reason of stationary insulation bars 29. The members 27 and 28 may be supported in any suitable manner so as to be insulated from each other and to be properly spaced. There are as many members 27 and as many members 28 as there are columns of data to be sensed. All of the members 27 are electrically connected as by leads 32 to suitable make-and-break means of the Hollerith type as at 33, and thence to a source of current 34. Each member 28 is connected to one side of a respective relay 35, the other sides of the relays 35 being connected to the source 34. An auxiliary spark gap plate 36 connected to the same side of 34 that relays 35 are directly connected to is so adjusted as to members 27 as to prevent passage of current from members 27 to other than the holes through which it should pass. The relays 35 may be used to control sorters or tabulators as in the well known Hollerith system, or looms or other instrumentalities of automatic machines.

As the record passes between members 27 and 28, the make-and-break 33 is operated by its cam in timed relation with the advance of the record as is well known. Means are also known for sensing from plural impulses the code meaning and thereby operating the required relay. But in the present system it is not necessary that a pin or brush should pass through the puncture, nor that a current of very high pressure be used to force a spark through the air gap, for the charred orifices and linings of the perforations act to conduct the necessary current for the successful operation of the machine control. I have also found that the lodgement of grease and dirt in the punctures does not interfere with perfect functioning of the record.

I feel, therefore, that besides the new record and other instruments above described, I have devised a new system of machine control by records which consists in first making a record with conducting lined perforations and then introducing this record into a machine having spaced discharge members adapted to engage the conductive lining and pass current to machine control instruments.

I claim:

The combination with a platen and a type bar of means for causing said type bar to make a printing blow against a non-conductive record supported in operative relation to said platen, and means for automatically puncturing said record in accordance with the character on said type bar and for automatically making the walls of the punctures conductive simultaneously with the printing on said record by the type on said type bar.

ROBERT E. PARIS.